(12) United States Patent
Fushiki et al.

(10) Patent No.: US 8,104,842 B2
(45) Date of Patent: Jan. 31, 2012

(54) TRANSPORTER VEHICLE

(75) Inventors: Michio Fushiki, Ibaraki (JP); Hajimu Kozawa, Ibaraki (JP); Takashi Yagyu, Ibaraki (JP); Takayoshi Murahashi, Ibaraki (JP); Takashi Tateyama, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 264 days.

(21) Appl. No.: 12/437,904

(22) Filed: May 8, 2009

(65) Prior Publication Data
US 2010/0001573 A1    Jan. 7, 2010

(30) Foreign Application Priority Data

Jul. 4, 2008  (JP) ................................. 2008-175669
Mar. 31, 2009  (JP) ................................. 2009-86231

(51) Int. Cl.
*B60P 1/04*    (2006.01)

(52) U.S. Cl. .................................................. 298/17 R (58) Field of Classification Search ................. 298/17 R, 298/22 C, 19 R, 22 R, 22 P, 22 TT, 17 T, 298/17 B, 17 S
See application file for complete search history.

(56) References Cited

U.S. PATENT DOCUMENTS

| 4,019,781 | A | * | 4/1977 | Ray | 298/22 J |
| 5,385,391 | A | * | 1/1995 | Dickerson | 298/17 R |
| 2003/0178883 | A1 | * | 9/2003 | Hinds et al. | 298/17 R |

FOREIGN PATENT DOCUMENTS

JP    1-244933 A    9/1989

* cited by examiner

*Primary Examiner* — Glenn Dayoan
*Assistant Examiner* — Sunsurraye Westbrook
(74) *Attorney, Agent, or Firm* — Mattingly & Malur, PC (57) ABSTRACT

An upper cross beam 10 for supporting a rear side of a cab 19 from below is formed as a separate member from a base frame 7. This upper cross beam 10 is separably mounted on left and right column portions 7E of the base frame 7 by using bolts 12. Namely, when an engine 27 is mounted to the base frame 7, the upper cross beam 10 is separated in advance from the base frame 7. Consequently, at the time of the operation of carrying in the engine 27, it merely suffices to vertically hoist or lower the engine 27 by use of a crane. It is thereby possible to carry in the engine 27 between the column portions 7E of the base frame 7 without being hampered by the upper cross beam 10.

6 Claims, 9 Drawing Sheets

TRANSPORTER VEHICLE

BACKGROUND ART

1. Field of the Invention

The present invention relates to a transporter vehicle which is suitably used in transporting such as crushed stones or earth and sand excavated from such as an open-pit stope, a mine, or the like.

2. Description of Prior Art

In general, a large-size transporter vehicle called a dump truck has a tiltable vessel (loading platform) on a frame of a vehicle body, and transports objects to be transported such as crushed stones or earth and sand or the like to an unloading site of, for instance, an exit port or the like in a state in which the objects to be transported are loaded in a large quantity on the vessel.

A transporter vehicle of this type according to the prior art is comprised of a frame extending in the forward and rearward direction; a loading platform which is tiltably provided on a rear portion of the frame so as to load the objects to be transported; an engine which is mounted on the frame by being positioned on the front side of the loading platform; and a cab which is provided on the frame by being positioned above the engine and defines an operator's room in its interior (e.g., see Japanese Patent Laid-Open No. H1-244933).

The frame which is used in such a transporter vehicle is formed by a base frame on a rear side of which the loading platform is provided and on a longitudinally intermediate portion of which left and right column portions projecting upward are formed with the engine sandwiched therebetween, and an upper cross beam provided on the base frame by means of the left and right column portions and adapted to support at least a portion (rear side) of the cab from below.

In this case, the upper cross beam extends in such a manner as to jut out in the leftward and rightward direction so as to be perpendicular to the base frame extending in the forward and rearward direction, and is fixed to each column portion of the base frame by use of a welding means so as to form an integral structure. Consequently, the column portions and the upper cross beam of the base frame form so-called a gate type structure when viewed from the front side, and are formed as a rigid frame structure.

For this reason, the cab provided on the upper cross beam is able to satisfy the rollover protection structure (abbreviated as ROPS) in accordance with ISO and JIS to thereby ensure the safety of the operator or the like who has climbed up into the cab.

By the way, in the above-described transporter vehicle according to the prior art, the upper cross beam for supporting the rear side of the cab from below is integrally formed on the column portions of the base frame by use of a welding means. Therefore, for example, at the time of mounting or dismounting the engine to or from the base frame, the upper cross beam constitutes a hindrance, and the following problem occurs.

Namely, since the engine serving as a prime mover of the transporter vehicle is mounted on the base frame by being positioned on the front side of the loading platform, the engine is unfavorably disposed such that the left and right sides are sandwiched between the left and right column portions of the base frame, and the upper side is covered by the upper cross beam. It should be noted that the engine is an expensive product (part), and if the upper cross beam is welded after mounting the engine on the base frame, there is a possibility of the engine becoming damaged by sparks and the like during welding.

Consequently, when the engine is mounted to the base frame with the upper cross beam integrally formed thereon in, for example, an assembly process of the vehicle, it is necessary to hoist the engine by a crane or the like and lower it into the base frame so as to avoid the upper cross beam while the suspended engine is being transferred in the horizontal direction between the left and right column portions. Thus, a time-consuming operation is required.

Moreover, in case the engine is collided against a peripheral member (e.g., each column portion and the upper cross beam of the base frame), the expensive parts including the engine may become damaged or broken, so that a cautious operation is required for assembly personnel at the time of the carrying in and mounting of the engine. Hence, there is a problem in that the burden imposed on the assembly personnel is large. Additionally, in this respect, a similar problem occurs when the engine is dismounted from the base frame at the time of maintenance such as a periodic inspection.

In addition, when the engine is lifted up (suspended) between the base frame and the upper cross beam, it is necessary to secure a space (vertical gap) for this purpose, so that the upper cross beam must be installed in advance at a higher position than the upper end of the engine with leeway (gap). For this reason, the position of installation height of the cab becomes excessively high, which constitutes a major obstacle in lowering the overall height of the transporter vehicle.

Further, in view of such as the limitation of the transport width, the operation of integrating the upper cross beam to the column portions of the base frame by use of a welding means is normally performed in the field where the transporter vehicle is operated. However, such welding operation in the field consumes extra labor and time. Furthermore, some welding operations require expertise, so that there is a problem in that it is difficult to ensure reliability of welded portions.

SUMMARY OF THE INVENTION

In view of the above-described problems of the prior art, an object of the present invention is to provide a transporter vehicle with which the operation of mounting and dismounting the engine to or from the base frame can be performed easily while improving the operating efficiency at the time of assembly of the vehicle.

Another object of the present invention is to provide a transporter vehicle which is capable of further lowering the position of installation height of the cab than heretofore by lowering the installation height of the upper cross beam, thereby making it possible to lower the overall height of the vehicle.

Further, another object of the present invention is to provide a transporter vehicle which makes it possible to reduce the welding operation in the field, perform the assembly operation in the field efficiently in a short period of time, and improve reliability and the like.

To overcome the above-described problems, the invention is applied to a transporter vehicle comprising: a frame extending in a forward and rearward direction and forming a support structure; a loading platform provided tiltably on a rear portion of the frame to load objects to be transported; an engine mounted on the frame by being positioned on a front side of the loading platform; and a cab provided on the frame by being positioned above the engine, the cab defining an operator's room in its interior.

The characteristic feature of the construction adopted in the present invention lies in that the frame is formed by a base frame on which the loading platform and the engine are provided and on a longitudinally intermediate portion of which left and right column portions projecting upward are formed with the engine located therebetween, and an upper cross beam formed as a separate member from the base frame and adapted to support at least a portion of the cab from below, and that the upper cross beam is arranged to be separably mounted on the column portions by use of fastening means in a state in which the upper cross beam extends in a leftward and rightward direction at positions of upper portions of the column portions of the base frame.

By this structure, it is unnecessary to fix the upper cross beam to the column portions of the base frame by use of the welding means as in the prior art, and the welding operation requiring expertise can be dispensed with. In addition, when the engine is mounted to the base frame, the operation of carrying in the engine can be performed smoothly without being hampered by the upper cross beam, and the upper cross beam can be installed on the column portions of the base frame by using fastening means after the assembling of the engine. Further, at the time of the maintenance operation, the operation of dismounting and remounting the engine can be performed with the upper cross beam removed from the base frame, thereby making it possible to improve the operating efficiency at the time of the assembly and maintenance of the vehicle.

In addition, at the time of the carrying in and out of the engine, the operation can be performed smoothly without being hampered by the upper cross beam by vertically hoisting or lowering the engine by, for example, a crane. For this reason, it is unnecessary to make the position of installation height of the upper cross beam excessively high as in the case of the prior art, and the installation height (position) of the cab can be made lower than heretofore, thereby making it possible to lower the overall height of the vehicle. Furthermore, at the time of assembling the transporter vehicle in the field, it is possible to reduce the welding operation in the field, perform the assembly operation in the field efficiently in a short period of time, and improve reliability and the like.

In addition, according to the present invention, the base frame is formed by a rear frame portion on a rear side of which the loading platform is mounted and left and right leg portions extending from a front end side of the rear frame portion toward a front side in such a manner as to spread wide apart in a bifurcated shape and on an inner side of which the engine is disposed, the left and right column portions being each arranged to be provided in such a manner as to project upward from a longitudinally halfway position of each of the left and right leg portions.

By this structure, since the base frame has the left and right leg portions extending from the rear frame portion toward the front side in such a manner as to spread wide apart in a bifurcated shape, the engine can be disposed in such a manner as to be sandwiched between these leg portions, and the left and right column portions can be provided in such a manner as to project upward from this position.

Meanwhile, according to the present invention, the left and right column portions are each arranged to project upward from an upper surface side of each of the left and right leg portions in such a manner as to be curved in a circular arc shape. As the left and right column portions are projected upward from the upper surface side of the respective leg portions while being curved in a circular arc shape, it is possible to avoid the occurrence of a stress concentration, so that each column portion can be formed with a rigid structure.

Further, according to the present invention, a mounting member to which the upper cross beam is mounted is provided at a position of an upper end of the column portions, and the upper cross beam is arranged to be separably fastened to the mounting member by use of the fastening means. Consequently, when the upper cross beam is mounted on the column portions of the base frame, the upper cross beam can be disposed on the column portions by means of the mounting members, and the two members in this state can be fastened by the fastening means.

In this case, an upper surface side of the mounting member is formed into a horizontal surface to which the upper cross beam is mounted in a state of surface contact therewith. As a result, when the upper cross beam is mounted on each column portion of the base frame, the upper cross beam can be placed on the horizontal surface of the mounting member in a stable state, so that the operation at the time of fastening these members by the fastening means can be performed smoothly.

Further, in this case, a suspension mounting portion to which a front wheel side suspension is mounted is provided on a lower side of the mounting member. Consequently, the front wheel side suspension can be mounted between the front wheel of the vehicle and the suspension mounting member, thereby making it possible to increase such as the mounting strength of the suspension.

Furthermore, according to the present invention, a housing defining a machine room therein is separably provided on the left and right leg portions of the base frame by being positioned on front sides of the column portions of the vehicle, and the housing is arranged to support a front side of the cab from below in cooperation with the upper cross beam. Consequently, the housing for a machine room can be separably provided on the left and right leg portions of the base frame by being positioned on the front sides of the column portions, whereby the cab can be stably supported from below by the housing and the upper cross beam.

DETAILED DESCRIPTION OF THE INVENTION

Hereafter, referring to the accompanying drawings, a detailed description will be given of a transporter vehicle in accordance with an embodiment of the invention by citing as an example a dump truck which transports crushed stones excavated from a mine.

Figure 1:
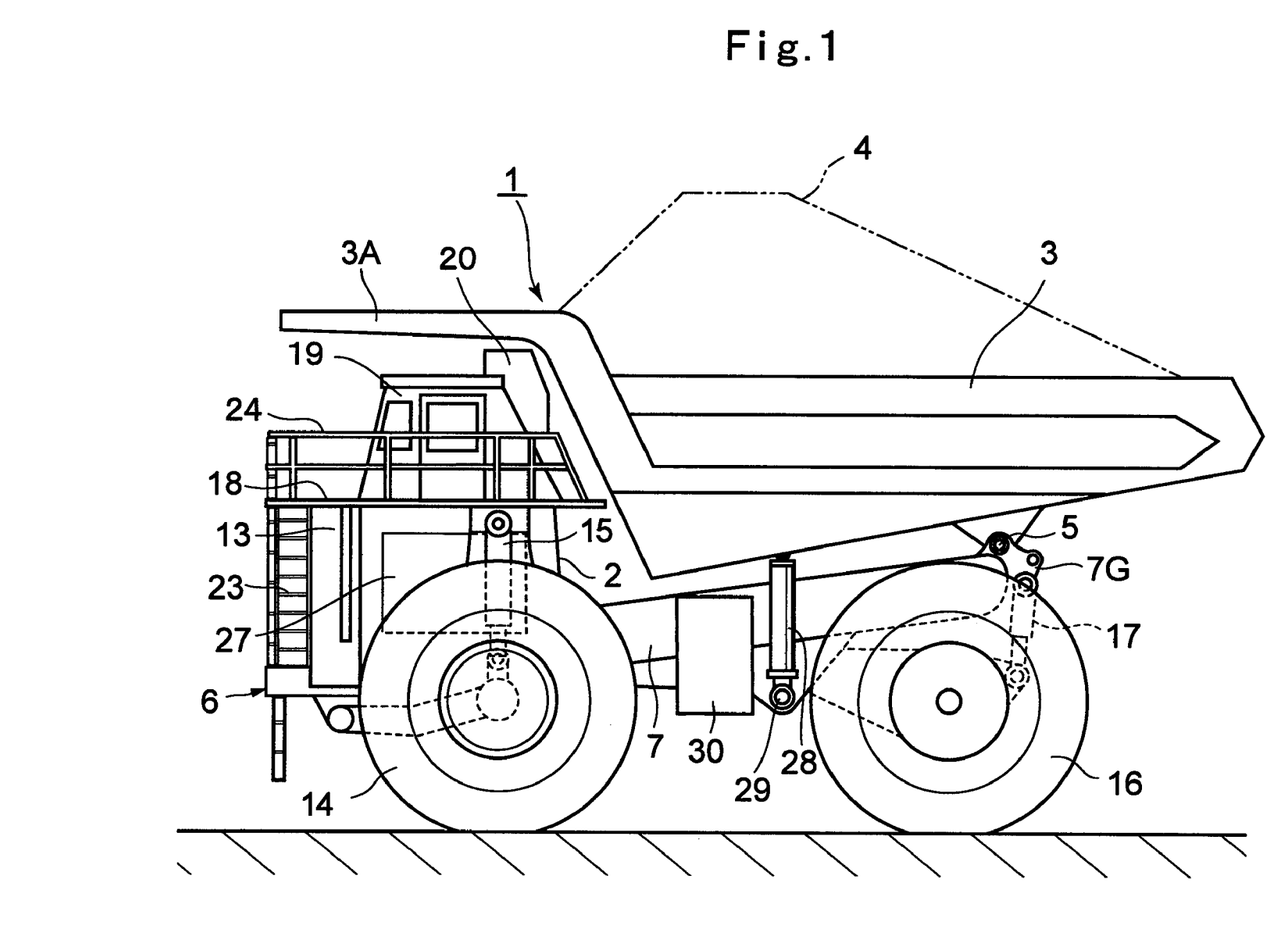
FIG. 1 is a front elevational view illustrating a dump truck according to an embodiment of the present invention.
Figure 2:
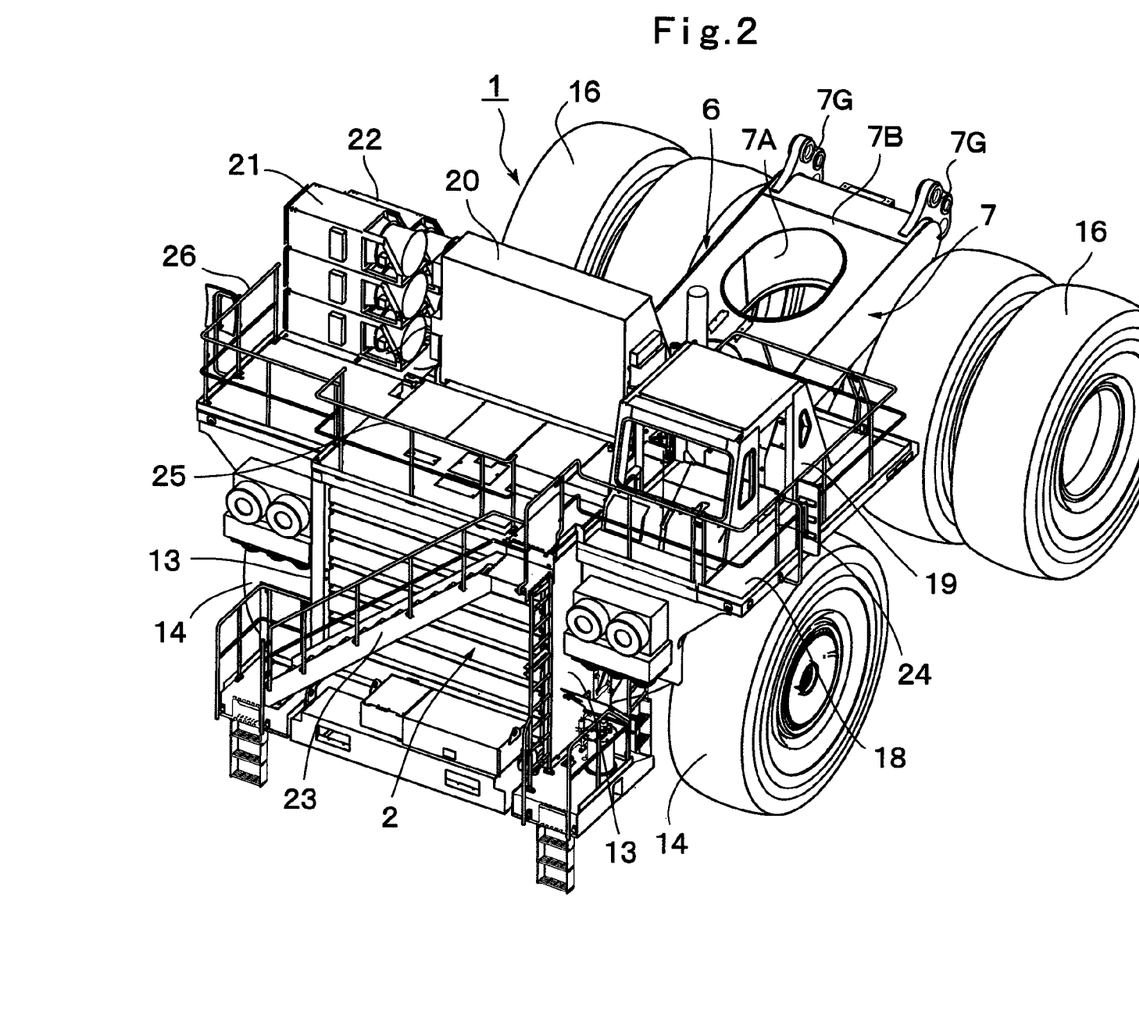
FIG. 2 is a perspective view, taken from a diagonally forward right direction, of the dump truck with a vessel removed.

Here, FIGS. 1 to 9 show an embodiment of the invention. In the drawings, denoted at 1 is a dump truck which is a large-size transporter vehicle. As shown in FIGS. 1 and 2, the dump truck 1 is largely comprised of a vehicle body 2 forming a rigid frame structure and a vessel 3 serving as a loading platform which is tiltably mounted on the vehicle body 2. Further, the vehicle body 2 is formed by including, among others, a frame 6, a housing 13, a floor 18, and a cab 19, which will be described later.

In addition, the vessel 3 is formed as a large-size container whose overall length reaches as much as 10 to 14 meters to load a large volume of heavy objects to be transported such as crushed stones or other similar objects (hereafter referred to as crushed stones 4). The rear side bottom portion of the vessel 3 is coupled to a rear end side (below-described bracket portions 7G) of the vehicle body 2 tiltably by means of connecting pins 5 and the like. In addition, a protector 3A is integrally provided on a front side of the vessel 3 in such a manner as to extend horizontally forward from its upper portion. This protector 3A extends to a vicinity of the position of a front end of the floor 18 in a state in which the protector 3A covers the below-described cab 19 from above.

Thus, with the dump truck 1, the bottom side of the vessel 3 is rotatably supported by the bracket portions 7G of a below-described base frame 7 by use of the connecting pins 5. For this reason, as a below-described hoist cylinder 28 is extended or contracted, the protector 3A of the vessel 3 is rotated (raised or lowered) vertically with the connecting pins 5 as the fulcrum. At this time, the vessel 3 is rotated between a transporting position shown in FIG. 1 and a dumping position (not shown), and the crushed stones 4 loaded in the vessel 3 are discharged at a predetermined cargo collection site from the vessel 3 in the dumping position in which the vessel 3 is tilted backward.

Figure 4:
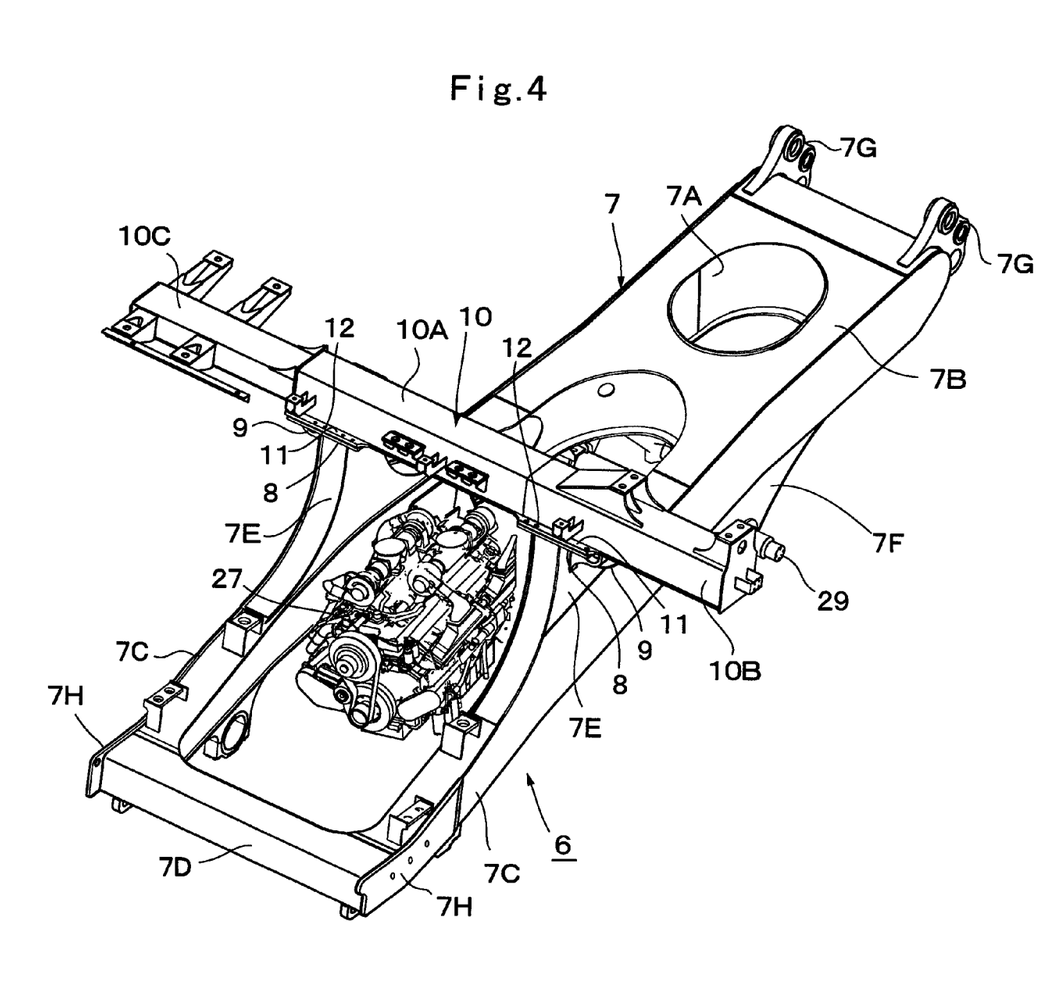
FIG. 4 is a perspective view illustrating a frame of the dump truck with the engine mounted.
Figure 5:
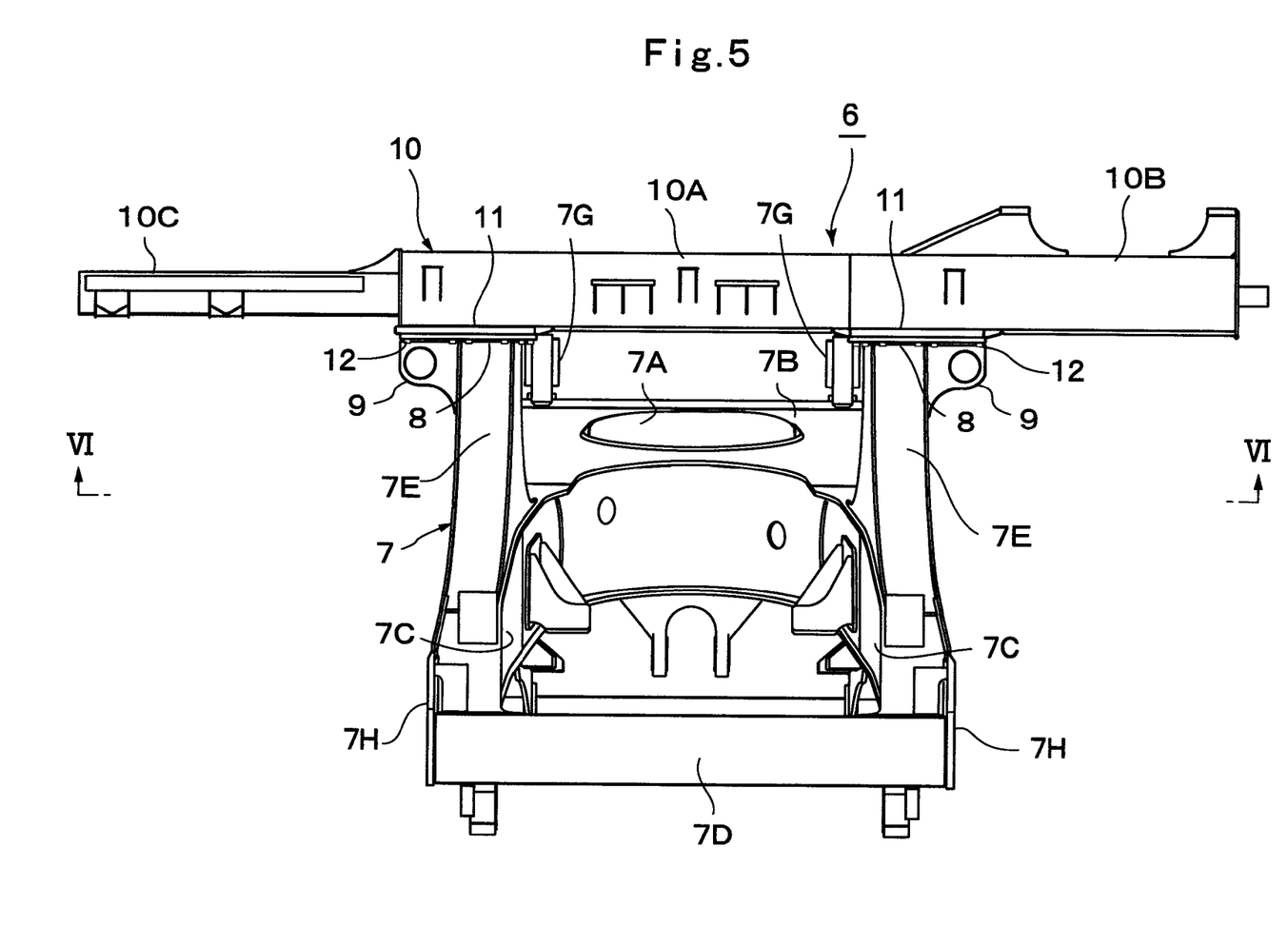
FIG. 5 is a side elevational view, taken from a forward direction, of the frame of the dump truck with the engine in FIG. 4 removed.
Figure 6:
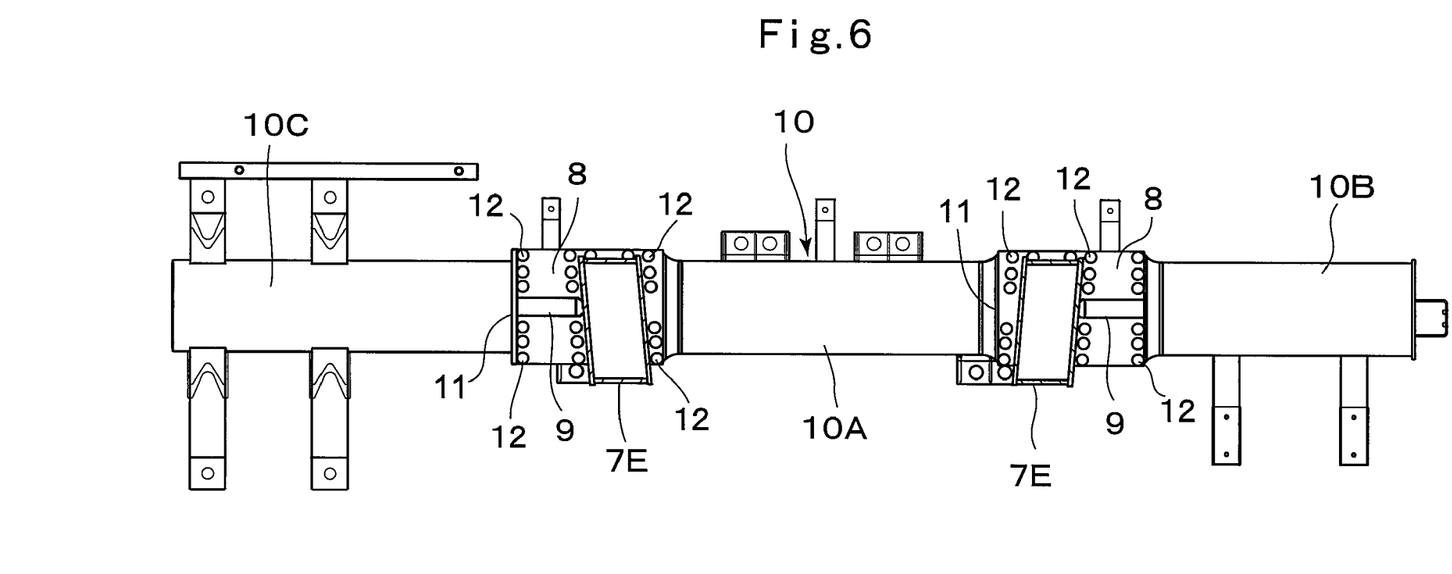
FIG. 6 is a fragmentary bottom view, taken in the direction of arrows VI-VI in FIG. 5, of an upper cross beam of the frame along with column portions of a base frame.

Indicated at 6 is a frame, which constitutes the chassis of the vehicle body 2. The frame 6 is formed as a support structure (a plate-worked structure fabricated by welding) extending in the forward and rearward direction, as shown in FIGS. 4 and 5, and is constituted by the base frame 7 and an upper cross beam 10, which will be described hereinafter.

Figure 7:
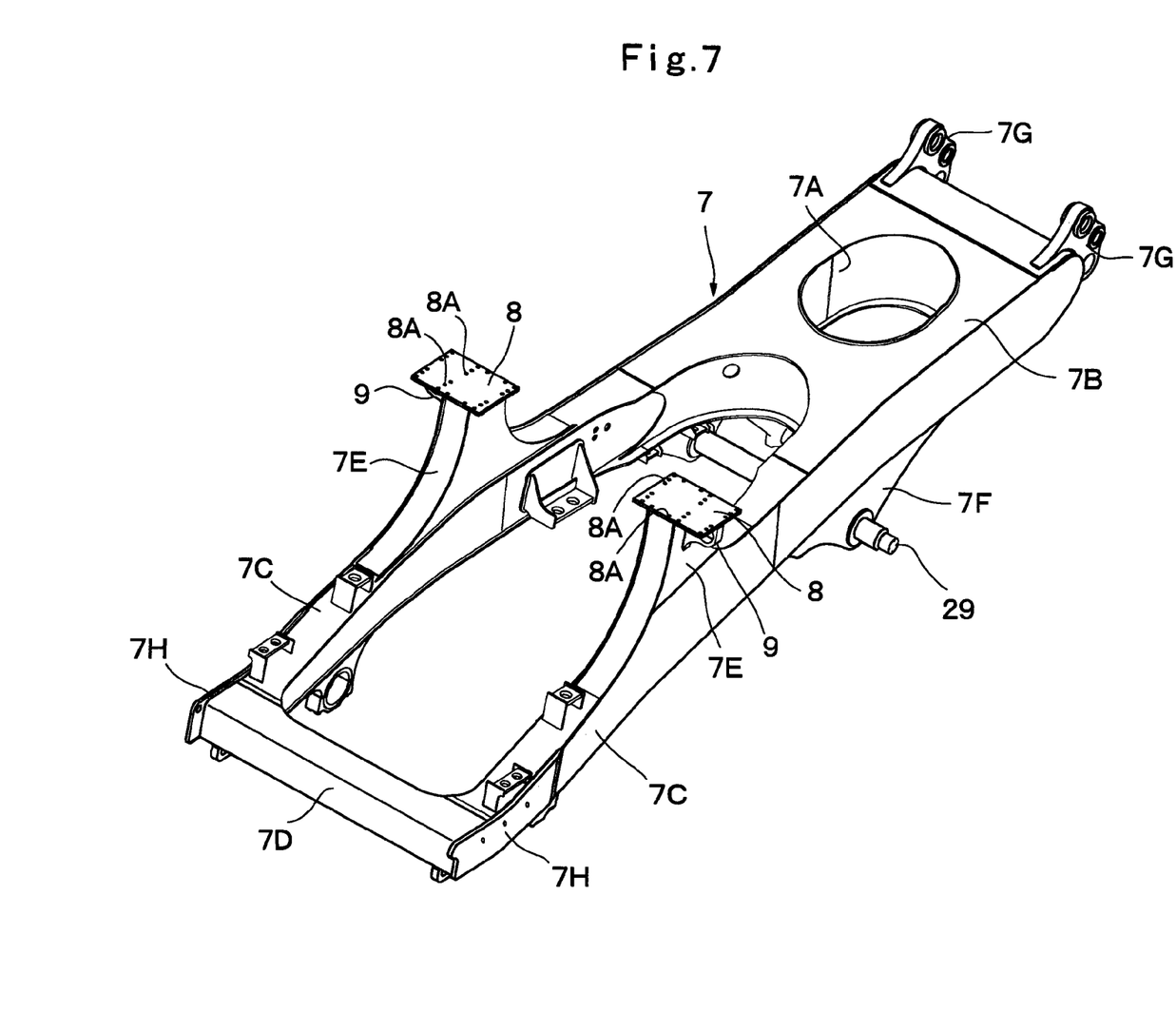
FIG. 7 is a perspective view illustrating the base frame of the dump truck as a single unit.
Figure 8:
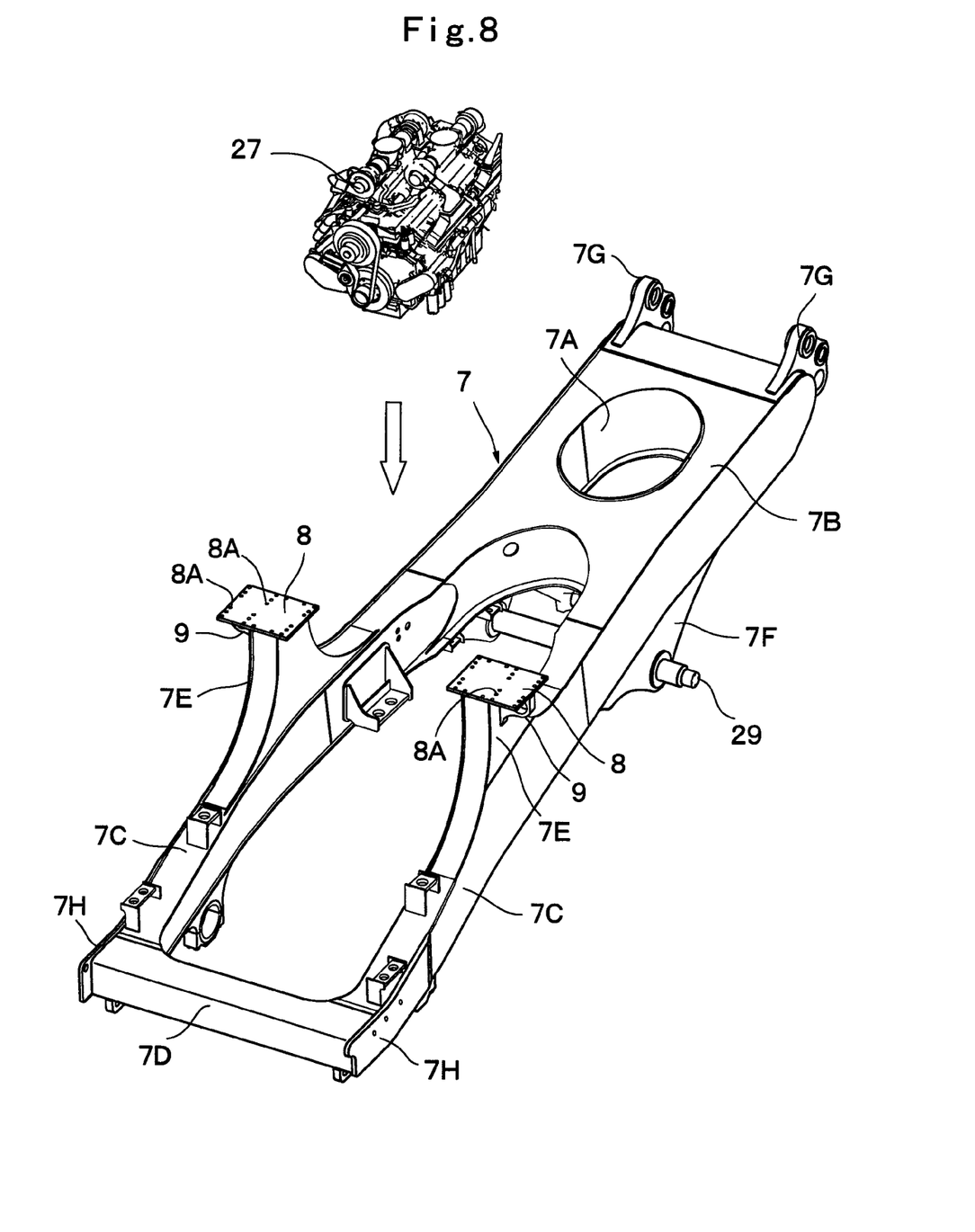
FIG. 8 is a perspective view illustrating a state prior to the mounting of the engine to the base frame.
Figure 9:
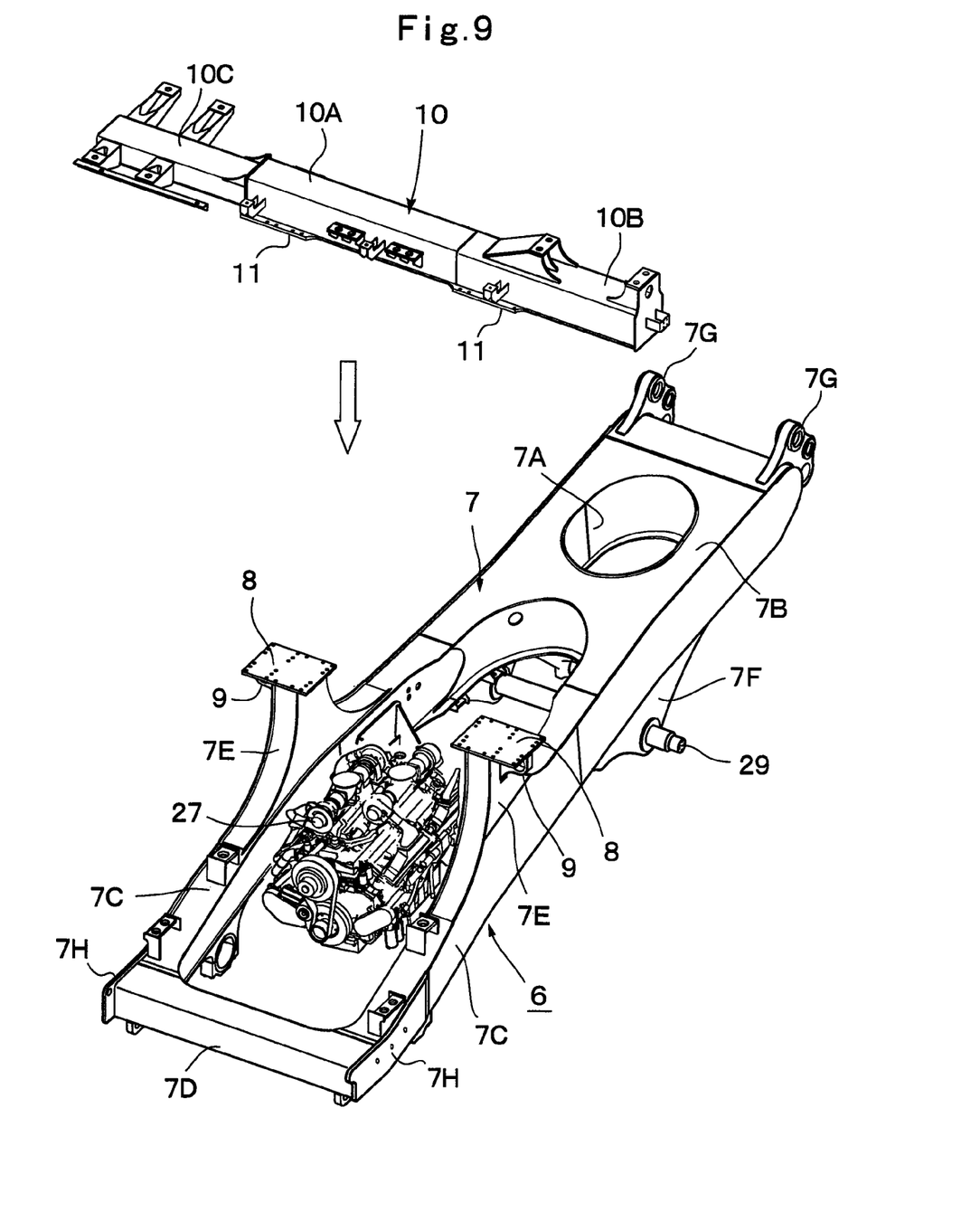
FIG. 9 is a perspective view illustrating a state prior to the assembly of the upper cross beam to the base frame with the engine mounted therein.

Indicated at 7 is a base frame, and this base frame 7 constitutes a principal part of the frame 6. As shown in FIGS. 7 to 9, this base frame 7 is formed by a rear frame portion 7B which is in a substantially rectangular shape and provided with an elliptical opening 7A in its center; a pair of left and right leg portions 7C extending forward from the front end side of the rear frame portion 7B in such a manner as to spread wide apart in a bifurcated shape (V- or U-shape); a connecting beam portion 7D connecting the front ends of the respective leg portions 7C in the leftward and rightward direction; a pair of left and right column portions 7E each projecting upward from a longitudinally halfway position of each leg portion 7C in such a manner as to be curved in a circular arc shape; and a pair of left and right cylinder mounting portions 7F each projecting downward in a chevron shape from a vicinity of a boundary portion between the rear frame portion 7B and each leg portion 7C.

Figure 3:
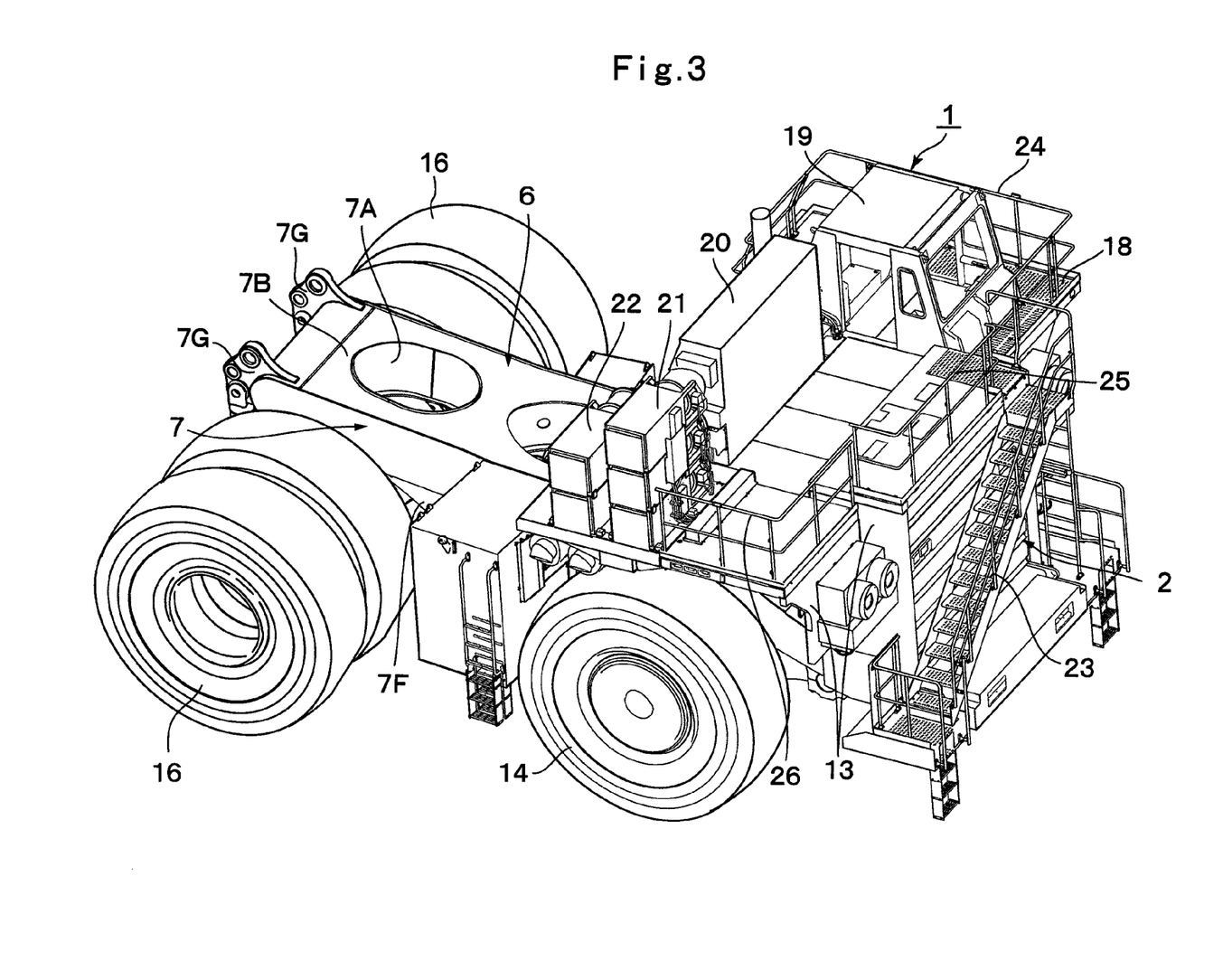
FIG. 3 is a perspective view, taken from an opposite side to FIG. 2, of the dump truck with the vessel removed.

In this case, since the rear frame portion 7B of the base frame 7 is sandwiched from both left and right directions by a below-described pair of rear wheels 16 each constituted by a double tire, as shown in FIGS. 2 and 3, the rear frame portion 7B is formed with a small widthwise dimension. In contrast, a below-described pair of front wheels 14 is each constituted by single tires, and a below-described pair of front wheel side suspensions 15 is preferably each disposed at a position as close to the front wheel 14 as possible. For this reason, the left and right leg portions 7C are formed so as to extend forward while spreading widely apart, forming a substantially V- or U-shape with respect to the rear frame portion 7B, as shown in FIG. 7.

Further, the left and right column portions 7E are each formed so as to be curved from the upper surface side of the leg portion 7C toward a below-described lower flange plate 8 in a circular arc shape with a predetermined curvature, thereby providing a measure to avoid the occurrence of such as a stress concentration between the leg portion 7C and the column portion 7E. Further, the column portions 7E support the below-described upper cross beam 10 from below with high rigidity.

Meanwhile, the cylinder mounting portions 7F of the base frame 7 constitute mounting brackets for the hoist cylinder 28, which will be described hereinafter. In addition, the left and right pair of bracket portions 7G are provided on the rear end side of the rear frame portion 7B of the base frame 7, and the bracket portions 7G couple the rear side bottom portion of the vessel 3 tiltably by means of the connecting pins 5, as shown in FIG. 1.

Further, left and right housing mounting portions 7H are respectively provided on the left and right leg portions 7C by being located on the front side of the column portion 7E, and the below-described housing 13 is separably mounted by these housing mounting portions 7H.

Denoted at 8 are left and right lower flange plates 8 serving as mounting members which are respectively provided on the upper end sides of the left and right column portions 7E. These lower flange plates 8 are formed as rectangular flat plates by use of steel plates or the like, and are fixed to the upper end sides of the respective column portions 7E by a welding means or the like. Further, the lower flange plate 8 is mounted in a horizontal state with respect to the ground. In this case, the lower flange plate 8 is formed in such a manner as to jut out toward the outer side in the leftward and rightward direction more than the outer side surface of each column portion 7E so as to provide the suspension mounting portions 9 on the lower side thereof.

In this instance, the lower flange plates 8 are formed by thicker steel plates than, for example, the steel plates used for the leg portions 7C and the column portions 7E of the base frame 7 which form a plate-worked structure. In addition, multiplicity of bolt insertion holes 8A, the number of which reaches as many as 10 to 20 pieces, are bored in the lower flange plate 8, and the bolts 12 serving as a fastening means, which will be described later, are fitted in these bolt insertion holes 8A. Further, an upper flange plate 11 on the below-described upper cross beam 10 side is abutted against the lower flange plate 8 in a state of surface contact therewith, and the lower flange plate 8 and the upper flange plate 11 in this state are detachably fastened by using the multiplicity of bolts 12 and the like.

Denoted at 9 are left and right suspension mounting portions, which are respectively provided on the left and right column portions 7E by being each located on the lower surface side of the lower flange plate 8. Each of these suspension mounting portions 9 is formed as a bracket plate to which the below-described front wheel side suspension 15 is rotatably mounted. Each suspension mounting portion 9 projects toward the outer side in the leftward and rightward direction more than the position of the outer surface of the column portion 7E with respect to the lower flange plate 8. Further, the upper surface side of the suspension mounting portion 9 is fixed to the lower surface of the lower flange plate 8 by the welding means, and this suspension mounting portion 9 functions as a reinforcing rib for the lower flange plate 8. Meanwhile, the lower flange plate 8 functions as a reinforcing member for the suspension mounting portion 9.

Indicated at 10 is an upper cross beam which constitutes the frame 6 along with the base frame 7. As shown in FIGS. 4 to 6 and 9, this upper cross beam 10 is formed as a cross member extending in such a manner as to jut out in the leftward and rightward direction, and is formed as a separate member from the base frame 7. Further, the upper cross beam 10 extends in the leftward and rightward direction so as to support rear sides of such as the below-described floor 18 and cab 19 (see FIGS. 2 and 3) and to cover the below-described front wheels 14 from above together with the floor 18. Accordingly, the upper cross beam 10 has the function of supporting the floor 18 and the cab 19 from below in a stable state together with the housing 13.

In this case, the upper cross beam 10 is formed by an intermediate beam portion 10A located in its longitudinally intermediate portion, as well as a one-side beam portion 10B and an other-side beam portion 10C which are respectively provided integrally on both left and right sides of the intermediate beam portion 10A by the welding means. Further, a below-described control cabinet 20 is mounted on the intermediate beam portion 10A of the upper cross beam 10, the cab 19 and the like are mounted on the one-side beam portion 10B, and below-described grid boxes 21 and 22 and the like are mounted on the other-side beam portion 10C.

Indicated at 11 are left and right upper flange plates provided on the lower surface side of the upper cross beam 10, and the upper flange plates 12 are formed into the shape of rectangular flat plates by the use of thick steel plates or the like in the same way as the above-described lower flange plates 8. Besides, the respective upper flange plates 11 are fixed to the lower surface side of the upper cross beam 10 in the vicinity of a boundary portion between the intermediate beam portion 10A and one of the one-side beam portion 10B and the other-side beam portion 10C by use of the welding means. Further, each upper flange plate 11 on the upper cross beam 10 side is abutted against the lower flange plate 8 on each column portion 7E side in a state of surface contact therewith, and these upper flange plate 11 and the lower flange plate 8 in this state are fastened together by means of the bolts 12 and the like, which will be described hereinafter.

Denoted at 12 are multiplicity of bolts serving as the fastening means adopted in this embodiment, and these bolts 12 detachably fasten the lower flange plate 8 and the upper flange plate 11 in a mutually abutted state to thereby fix the upper cross beam 10 onto the respective column portions 7E of the base frame 7.

Thus, the upper cross beam 10 is detachably assembled onto the column portions 7E of the base frame 7 by means of the lower flange plates 8, the upper flange plates 11, and the bolts 12 and the like, and is thereby formed as a rigid frame structure. Consequently, the cab 19 provided on the upper cross beam 10 is able to satisfy the rollover protection structure (abbreviated as ROPS) in accordance with ISO and JIS to thereby ensure the safety of the operator or the like who has climbed up into the cab 19.

Denoted at 13 is a housing, which constitutes a part of the vehicle body 2, and the housing 13 is separably mounted on the left and right leg portions 7C by means of the respective housing mounting portions 7H at the position on the front side of the column portion 7E. Further, this housing 13 defines a machine room for accommodating therein such as a radiator (not shown) located in front of a below-described engine 27. Meanwhile, the housing 13 also has the function of supporting the below-described floor 18 and the cab 19 from below in cooperation with the above-described upper cross beam 10. Namely, the housing 13 supports the floor 18 and the cab 19 from below in a stable state in cooperation with the upper cross beam 10.

Designated at 14 are left and right front wheels, which are rotatably provided on the front side of the vehicle body 2 to constitute steering wheels which are steered by the operator of the dump truck 1. Further, the front wheels 14 are formed with a tire diameter (outside diameter) of, for example, as large as 2 to 4 meters in the same way as the rear wheels 16 which will be described later on.

Indicated at 15 is a pair of left and right front wheel side suspensions (only one is shown in FIG. 1), which are each provided between the front portion of the vehicle body 2 and the front wheel 14. These front wheel side suspensions 15 are each constituted by such as a hydraulic shock absorber or the like, and provided telescopically between the suspension mounting portion 9 (see FIG. 4) of the frame 6 and the front wheel 14. Further, these front wheel side suspensions 15 damp the vibrations of the front wheels 14 due to irregularities of the road surface from being transmitted to the front side of the vehicle body 2.

Indicated at 16 are left and right rear wheels, which are rotatably provided on the rear side of the vehicle body 2, and rear wheels 16 constitute drive wheels of the dump truck 1 which are rotatively driven by a traveling drive unit (not shown). Further, rear wheel side suspensions 17 constituted by such as a hydraulic shock absorber or the like are provided between the rear portion (the bracket portion 7G of the base frame 7) of the vehicle body 2 and the rear wheel 16. These rear wheel side suspensions 17 damp the vibrations on the rear wheel 16 side from being transmitted to the rear side of the vehicle body 2.

Indicated at 18 is a floor which is provided on the upper side of the housing 13 by being located on the lower side of the protector 3A. The floor 18 is disposed at a position higher than the front wheels 14, as shown in FIGS. 1 to 3, and forms a flat passageway surface on the upper side (housing 13) of the front portion of the vehicle body 2. Further, a cab 19, a control cabinet 20, and the like, which will be described hereinafter, are installed on the upper side of the floor 18.

Denoted at 19 is a cab which is provided on the upper cross beam 10 by being located under the lower side of the protector 3A. The cab 19 defines an operator's room in its interior, and a door (not shown) for the operator of the dump truck 1 to get into or get off from the inside is openably provided in a side surface of the cab 19. Further, an operator's seat, a steering handle, a starter switch, an accelerator pedal, a brake pedal, an operating lever (none are shown), and the like are provided inside the cab 19.

In this instance, the rear side of the cab 19 is installed on the one-side beam portion 10B of the upper cross beam 10. In addition, the front side of the cab 19 is supported from below by means of the housing 13, as shown in FIGS. 1 to 3.

Indicated at 20 is a control cabinet, which is provided on the upper side of the floor 18, and the control cabinet 20 is constituted by an inverter for controlling a motor as well as a control panel for controlling the electric current generated by a generator (not shown) provided on the below-described engine 27 and the engine speed. Besides, the control cabinet 20 is mounted on the intermediate beam portion 10A (see FIG. 4) of the upper cross beam 10.

Designated at 21 and 22 are grid boxes which are installed on the other-side beam portion 10C of the upper cross beam 10 by being positioned on the opposite side to the cab 19 with the control cabinet 20 placed therebetween, as shown in FIGS. 2 and 3. The grid boxes 21 and 22 constitute units made up of a resistor for consuming D.C. electric power during the deceleration of the vehicle and a blower for cooling that resistor.

Indicated at 23 is a ladder serving as ascending/descending steps provided on the front side of the vehicle body 2. The ladder 23 extends in a diagonally inclined manner from the lower side of the front portion of the vehicle body 2 toward the front side of the floor 18, as shown in FIGS. 1 to 3, and constitutes steps for such as the operator to get onto or get off from the floor 18.

In this instance, the protector 3A of the vessel 3 covers the cab 19 from above as shown in FIG. 1, and its distal end side extends to a vicinity of the front end of the floor 18. Consequently, the protector 3A of the vessel 3 has the functions of protecting the floor 18, the cab 19, the control cabinet 20, and the like from such as stones and rocks that come flying, and of protecting the operator in the cab 19 such as when the vehicle (dump truck 1) is overturned.

Indicated at 24 is a left side hand rail provided on the left side of the floor 18. As shown in FIGS. 2 and 3, the hand rail 24 is provided on the floor 18 so as to surround the left side and the front side of the cab 19 with an interval. Further, a passageway is formed on the floor 18 at a position between the cab 19 and the hand rail 24 so that the operator can walk around to check the peripheries of the cab 19.

In addition, as shown in FIG. 3, a front side hand rail 25 is provided around the floor 18 at a position between the floor 18 and the ladder 23, and a right side hand rail 26 is provided at a position corresponding to outer sides of the grid boxes 21 and 22. Further, as these hand rails 24 to 26 surround from the outer side the floor 18 positioned at a high place of, for example, 3 meters or more from the ground surface, the safety of operation (e.g., maintenance work) on the floor 18 is ensured.

Indicated at 27 is an engine as a prime mover provided in the vehicle body 2 by being positioned on the lower side of the floor 18. The engine 27 is constituted by using, for example, a large-size diesel engine or the like and is accommodated in the housing 13. Further, the engine 27 is started and stopped as the operator who has got into the cab 19 manually operates the starter switch.

Here, the engine 27 is mounted to the base frame 7 at a position between the left and right leg portions 7C, as shown in FIGS. 4 and 9. Further, the engine 27 in this state has its both left and right sides sandwiched between the column portions 7E of the base frame 7, while the upper side being covered by the upper cross beam 10.

Denoted at 28 is a pair of hoist cylinders (only one is shown in FIG. 1) for vertically tilting the vessel 3 with respect to the vehicle body 2. Each of these hoist cylinders 28 consists of a multi-stage (e.g., two-stage) hydraulic cylinder, and is provided telescopically between the vehicle body 2 and the vessel 3. Namely, the lower end side (rod side) of the hoist cylinder 28 is coupled rotatably to the cylinder mounting portion 7F of the base frame 7 by means of a support shaft 29, while the upper end side (tube side) thereof being coupled rotatably to the lower surface side of the vessel 3.

Further, when pressure oil is supplied into a bottom side oil chamber (not shown) in each hoist cylinder 28, the hoist cylinder 28 is extended in the vertical direction to raise the vessel 3 diagonally backward with the connecting pin 5 as a fulcrum. On the other hand, when the hydraulic oil is discharged from the bottom side oil chamber, the hoist cylinder 28 is contracted to rotate the vessel 3 to the downwardly lowered transporting position (see FIG. 1) with the connecting pin 5 as the fulcrum.

Designated at 30 is an operating oil tank, which is mounted on a side surface or the like of the vehicle body 2 (the base frame 7) by being positioned below the vessel 3, as shown in FIG. 1. The operating oil accommodated in the operating oil tank 30 is pressurized by the hydraulic pump so as to be supplied to or discharged from the hoist cylinder 28, a steering cylinder for power steering, and the like.

The dump truck 1 according to this embodiment has the above-described construction, and a description will be given of its operation.

First, in a quarry of a mine or the like, the crushed stones 4 to be transported are loaded onto the vessel 3 of the dump truck 1 by the use of a large-size hydraulic shovel (not shown). Then, the dump truck 1 transports the crushed stones 4 toward an unloading site in a state in which a large quantity of crushed stones 4 are loaded on the vessel 3.

Then, when the dump truck 1 has arrived at the unloading site, if the operator in the cab 19 manually performs the tilting operation of the operating lever consisting of an electric lever or the like, the hoist cylinders 28 are extended due to the supply of pressure oil to raise the vessel 3 so as to tilt it diagonally backward. At this time, as the vessel 3 is upwardly rotated with the connecting pins 5 as the fulcrum, the dump truck 1 become capable of discharging the crushed stones 4 in the vessel 3 toward the cargo collection site so as to cause the crushed stones 4 to slide downward.

Next, when, at the stage of completion of the dumping operation of the crushed stones 4, the operator manually performs the tilting operation of the aforementioned operating lever to allow the hydraulic oil in the hoist cylinders 28 to be discharged, the hoist cylinders 28 are contracted in accordance with the self-weight of the vessel 3 and the like, thereby making it possible to lower the vessel 3 to the transporting position shown in FIG. 1 and seat the vessel 3 onto the vehicle body 2.

Incidentally, the engine 27 serving as a prime mover of the dump truck 1 is mounted to the base frame 7 by being positioned on the front side of the loading platform 3. Consequently, the engine 27 is disposed such that its left and right sides are sandwiched between the pair of left and right column portions 7E, while its upper side is covered by the upper cross beam 10, as shown in FIG. 4. For this reason, when the engine 27 is mounted to the base frame 7 during such as an assembly process of the vehicle, the upper cross beam 10 constitutes a hindrance, and a time-consuming operation is required.

Accordingly, in this embodiment, the arrangement provided is such that the upper cross beam 10 which supports the rear side of the cab 19 from below is formed as a separate member, and this upper cross beam 10 is separably mounted on the column portions 7E of the base frame 7 by using the bolts 12. Namely, the lower flange plate 8 and the upper flange plate 11 are abutted against each other on each column portion 7E of the base frame 7, and the respective flange plates 8 and 11 in this state are fastened by the bolts 12, thereby detachably assembling the upper cross beam 10 to the column portions 7E of the base frame 7.

For this reason, when the engine 27 is mounted to the base frame 7, the upper cross beam 10, the housing 13, the cab 19, the ladder 23, and the like are separated in advance from the base frame 7. Consequently, the carrying-in operation of the engine 27 can be performed smoothly, as shown in FIGS. 8 and 9, without being hampered by the upper cross beam 10. Namely, during the carrying-in operation of the engine 27, the operation can be performed smoothly by merely hoisting and lowering the engine 27 vertically by means of a crane (not shown), for example.

Namely, as shown in FIG. 9, the engine 27 is positioned between the left and right leg portions 7C and is mounted to the base frame 7. Next, the upper cross beam 10 is hoisted by use of the crane, and is lowered vertically along the direction of arrow in FIG. 9. Consequently, each upper flange plate 11 on the upper cross beam 10 side can be abutted against each lower flange plate 8 on the column portions 7E with a wide contact area.

Next, as each lower flange plate 8 and each upper flange plate 11 in this state are fastened by the bolts 12, the upper cross beam 10 can be firmly mounted on the column portions 7E of the base frame 7. As a result, it is unnecessary to fix the upper cross beam 10 to the column portions 7E of the base frame 7 by the welding means as in the prior art, and the welding operation requiring expertise can be dispensed with.

As such, when the dump truck 1 is assembled in the field, it is possible to reduce the welding operation in the field, perform the assembly operation efficiently in a short period of time, and improve reliability and the like. In addition, at the time of the maintenance operation for carrying out an inspection, the operation of dismounting and remounting the engine 27 can be performed with the upper cross beam 10 removed from the base frame 7, as shown in FIG. 9. Accordingly, it is possible to substantially improve the operating efficiency at the time of the assembly and maintenance of the vehicle.

Moreover, at the time of the carrying in and out of the engine 27, it is sufficient to vertically hoist or lower the engine 27 by, for example, a crane, and the operation can be performed smoothly without being hampered by the upper cross beam 10. For this reason, it is unnecessary to form an excessive gap between the upper side of the engine 27 and the upper cross beam 10, and the position of installation height of the upper cross beam 10 can be made substantially lower than the prior art. In consequence, the position of installation height of the cab 19 can be made lower than heretofore, thereby making it possible to lower the overall height of the vehicle body 2 of the dump truck 1.

In addition, according to this embodiment, the base frame 7 constituting a principal part of the frame 6 is formed by the pair of leg portions 7C which extend forward from the position of the rear frame portion 7B in such a manner as to spread wide apart in a V- or U-shape. As a result, the engine 27 can be disposed so as to be sandwiched between the pair of leg portions 7C, so that the engine 27 can be mounted compactly within the base frame 7.

In this case, the rear frame portion 7B of the base frame 7 is formed with a small widthwise dimension, and is disposed in a state of being sandwiched between the left and right rear wheels 16 constituted by a double tire, as shown in FIGS. 2 and 3. In contrast, the left and right front wheels 14 are constituted by single tires. On the other hand, the left and right leg portions 7C are formed so as to extend forward while spreading widely apart, forming a substantially V- or U-shape with respect to the rear frame portion 7B, as shown in FIG. 7. Further, the suspension mounting portion 9 is so arranged to be provided on the upper end side of column portion 7E between the same and the lower flange plate 8.

For this reason, the front wheel side suspension 15 can be disposed at a position as close to the front wheel 14 constituted by the single tire as possible, so that the front wheel side suspension 15 can be stably mounted between the suspension mounting portion 9 of the base frame 7 and the front wheel 14. Moreover, even if the front wheels 14 vibrate due to irregularities of the road surface, the transmission of these vibrations to the front side of the vehicle body 2 can be effectively damped by the front wheel side suspensions 15.

Further, since the suspension mounting portion 9 is so arranged as to be provided on the lower surface side of the lower flange plate 8 by welding, it is possible to make effective use of the suspension mounting portion 9 as a reinforcing rib for the lower flange plate 8. Consequently, the lower flange plate 8 can be effectively used as a reinforcing member for the suspension mounting portion 9, and it is possible to increase such as the mounting strength of the front wheel side suspension 15.

Meanwhile, the pair of column portions 7E is arranged so as to project upward from the upper surface side of the leg portion 7C toward the lower flange plate 8 while being curved in a circular arc shape with a predetermined curvature. For this reason, it is possible to avoid the occurrence of such as a stress concentration between the leg portion 7C and the column portion 7E, so that each column portion 7E can be formed with a rigid structure, and the upper cross beam 10 can be supported by these column portions 7E from below with high rigidity.

In addition, the arrangement provided is such that the flat lower flange plate 8 is provided on the upper surface side of each column portion 7E by welding, and the upper flange plate 11 on the upper cross beam 10 side is mounted on the lower flange plate 8 in a state of surface contact therewith. For this reason, when the upper cross beam 10 is mounted on each column portion 7E of the base frame 7, the upper flange plate 11 on the upper cross beam 10 side can be placed on the lower flange plate 8 in a stable state, so that the operation at the time of fastening these flange plates 8 and 11 by the bolts 12 can be performed smoothly.

Furthermore, the arrangement provided is such that the housing mounting portions 7H are respectively provided on the left and right leg portions 7C of the base frame 7 by being each positioned on the front side of the column portion 7E, and the housing 13 for a machine room is separably provided on these housing mounting portions 7H. Consequently, the housing 13 can be separably provided on the left and right leg portions 7C of the base frame 7 by being positioned on the front sides of the column portions 7E, and therefore the floor 18 and the cab 19 can be stably supported from below by the housing 13 and the upper cross beam 10.

It should be noted that, in the above-described embodiment, a description has been given by citing as an example the dump truck 1 in which the vessel 3 is supported by the wheel-type vehicle body 2 having the front wheels 14 and the rear wheels 16. However, the invention is not limited to the same, and may also be applied to a transporter vehicle in which a vessel as a loading platform is mounted on, for example, a crawler type vehicle body.

What is claimed is:
1. A transporter vehicle comprising:
a frame extending in a forward direction and a rearward direction and forming a support structure;
a loading platform provided tiltably on a rear portion of said frame to load objects to be transported;
an engine mounted on said frame by being positioned on a front side of said loading platform; and
a cab provided on said frame by being positioned above said engine, said cab defining an operator's room,
wherein said frame includes a base frame on which said loading platform and said engine are disposed and said base frame has a left column portion and a right column portion which project upward from a longitudinally intermediate portion of said base frame with said engine located between said left column portion and said right column portion, and an upper cross beam formed as a separate member from said base frame and adapted to support at least a portion of said cab from below, wherein a left mounting member and a right mounting member to which said upper cross beam is mounted are respectively disposed at an upper end of said left column portion and an upper end of said right column portion of said base frame, and wherein said upper cross beam is to be separably mounted on said left mounting member and said right mounting member by a plurality of bolts in a state in which said upper cross beam extends laterally from said upper end of said left column portion and said upper end of said right column portion of said base frame.

2. The transporter vehicle of claim 1, wherein said base frame is formed by a rear frame portion on a rear side of which said loading platform is mounted and a left leg portion and a right leg portion extending from a front end side of said rear frame portion toward a front side in such a manner as to spread wide apart in a bifurcated shape and on an inner side of which said engine is disposed, said left column portion and said right column portion are each disposed in such a manner as to project upward from a longitudinally halfway position of each of said left leg portion and said right leg portion.

3. The transporter vehicle of claim 2, wherein said left column portion and said right column portion each project upward in a circular arc shape from an upper surface side of each of said left leg portion and said right leg portion respectively.

4. The transporter vehicle of claim 2, wherein a housing defining a machine room therein is separably provided on said left leg portion and said right leg portion of said base frame by being disposed on front sides of the left column portion and right column portion of said vehicle, and said housing supports a front side of said cab from below in cooperation with said upper cross beam.

5. The transporter vehicle of claim 1, wherein an upper surface side of each of said left mounting member and said right mounting member is formed into a horizontal surface to which said upper cross beam is mounted in a state of surface contact therewith.

6. The transporter vehicle of claim 1, wherein a suspension mounting portion to which a front wheel side suspension is mounted is provided on a lower side of each of said left mounting member and said right mounting member.

* * * * *